No. 729,331. PATENTED MAY 26, 1903.
E. GROSSE.
MACHINE FOR FEEDING BOOKS AND CUTTING THE EDGES THEREOF.
APPLICATION FILED FEB. 21, 1899.
NO MODEL. 6 SHEETS—SHEET 1.

No. 729,331. PATENTED MAY 26, 1903.
E. GROSSE.
MACHINE FOR FEEDING BOOKS AND CUTTING THE EDGES THEREOF.
APPLICATION FILED FEB. 21, 1899.
NO MODEL. 6 SHEETS—SHEET 2.

No. 729,331. PATENTED MAY 26, 1903.
E. GROSSE.
MACHINE FOR FEEDING BOOKS AND CUTTING THE EDGES THEREOF.
APPLICATION FILED FEB. 21, 1899.
NO MODEL. 6 SHEETS—SHEET 3.
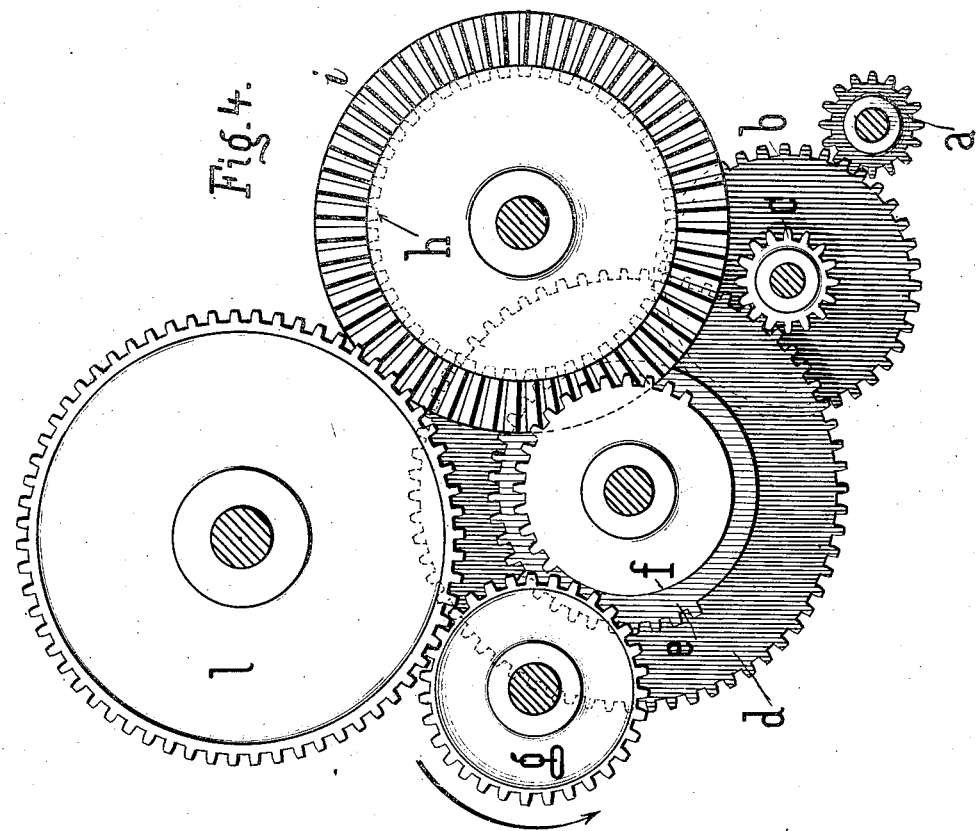
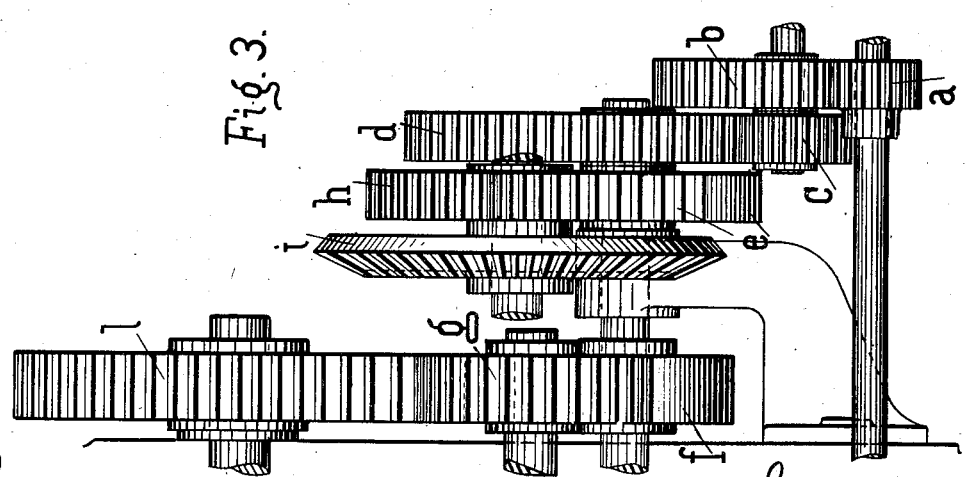

No. 729,331. PATENTED MAY 26, 1903.
E. GROSSE.
MACHINE FOR FEEDING BOOKS AND CUTTING THE EDGES THEREOF.
APPLICATION FILED FEB. 21, 1899.
NO MODEL. 6 SHEETS—SHEET 4.
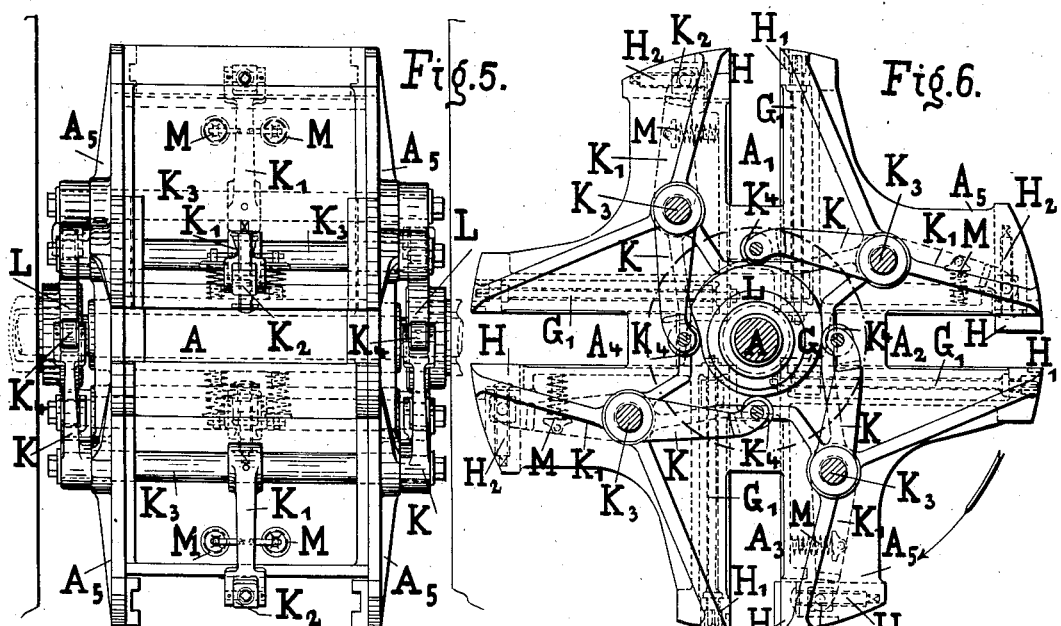
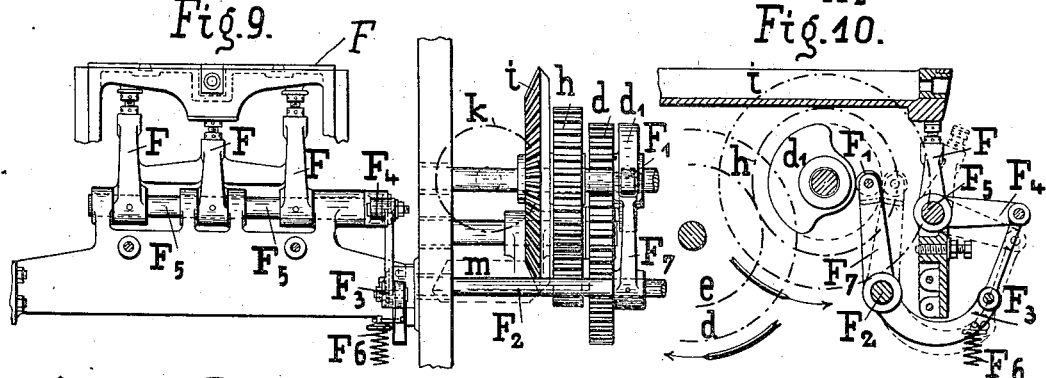
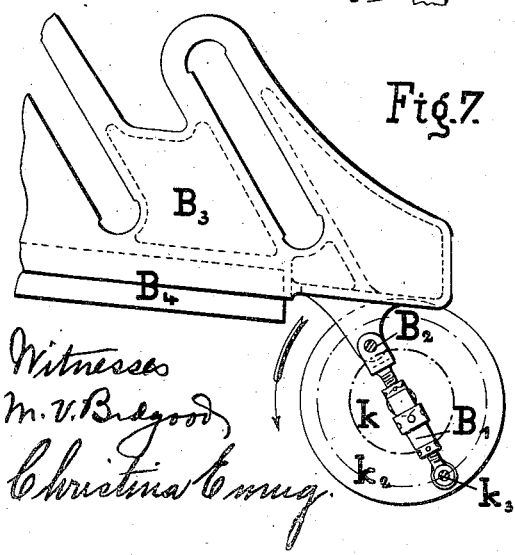
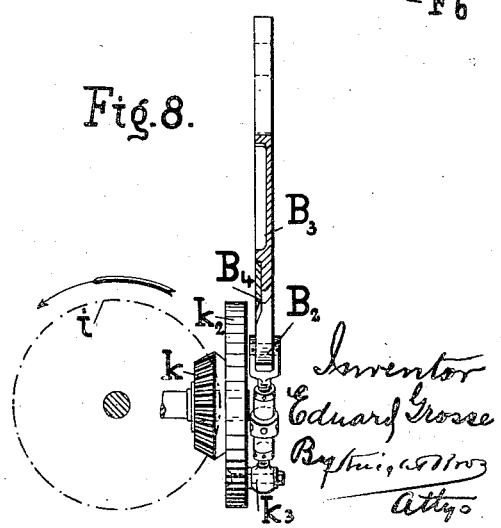
Witnesses
M. V. Bidgood
Christina Ennig
Inventor
Eduard Grosse
Attys No. 729,331. PATENTED MAY 26, 1903.
E. GROSSE.
MACHINE FOR FEEDING BOOKS AND CUTTING THE EDGES THEREOF.
APPLICATION FILED FEB. 21, 1899.
NO MODEL. 6 SHEETS—SHEET 6.

No. 729,331.

Patented May 26, 1903.

UNITED STATES PATENT OFFICE.

EDUARD GROSSE, OF REUDNITZ, NEAR LEIPZIG, GERMANY.

MACHINE FOR FEEDING BOOKS AND CUTTING THE EDGES THEREOF.

SPECIFICATION forming part of Letters Patent No. 729,331, dated May 26, 1903.

Application filed February 21, 1899. Serial No. 706,393. (No model.)

*To all whom it may concern:*

Be it known that I, EDUARD GROSSE, residing at No. 1 Elsastrasse, Reudnitz, near Leipzig, Germany, have invented certain new and useful Improvements in Machines for Cutting the Edges of Books, of which the following is a specification.

This invention relates to a machine for cutting the edges of books, provided with mechanism for feeding the books and a device for holding the latter and with mechanism for automatically delivering the books.

Figure 1:
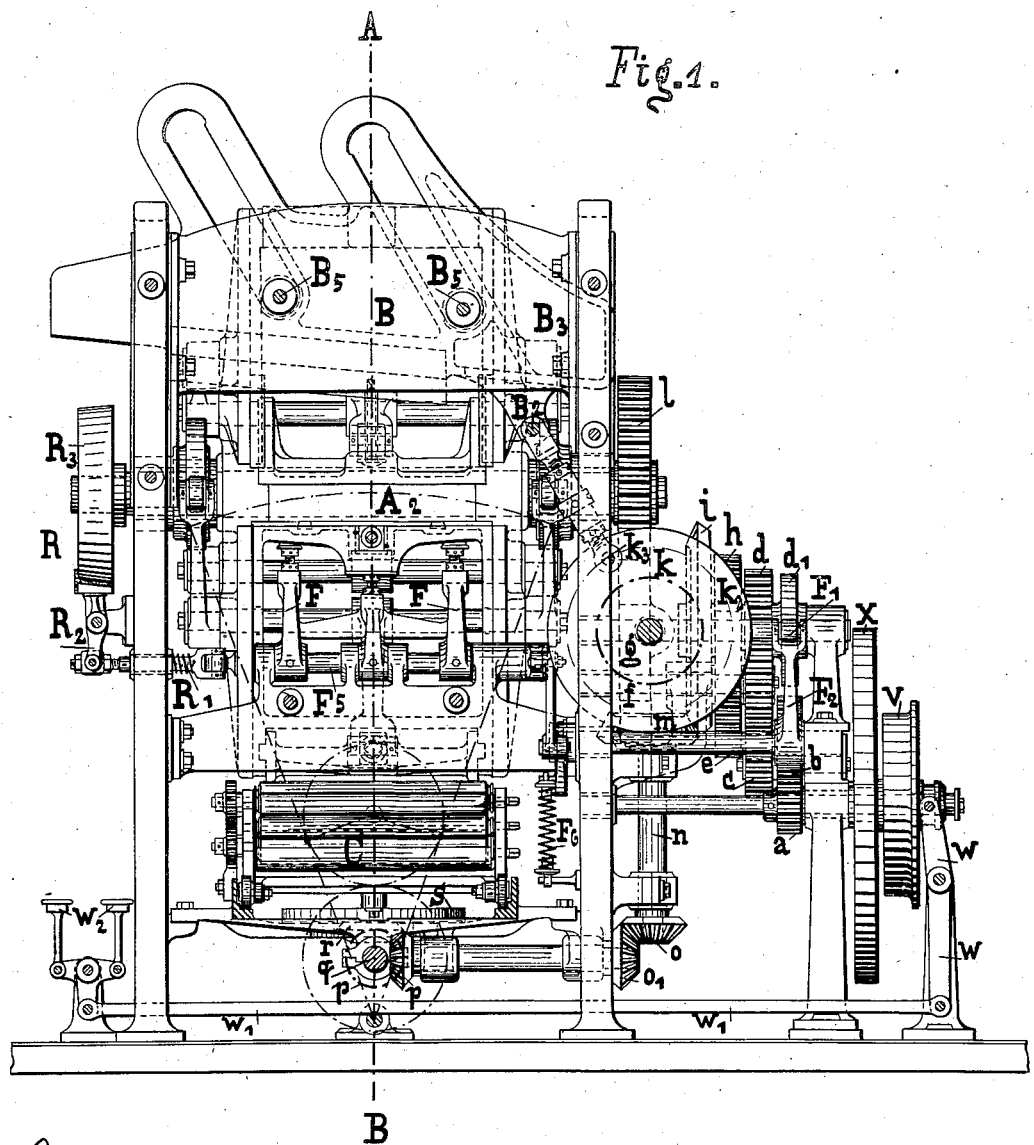
Figure 2:
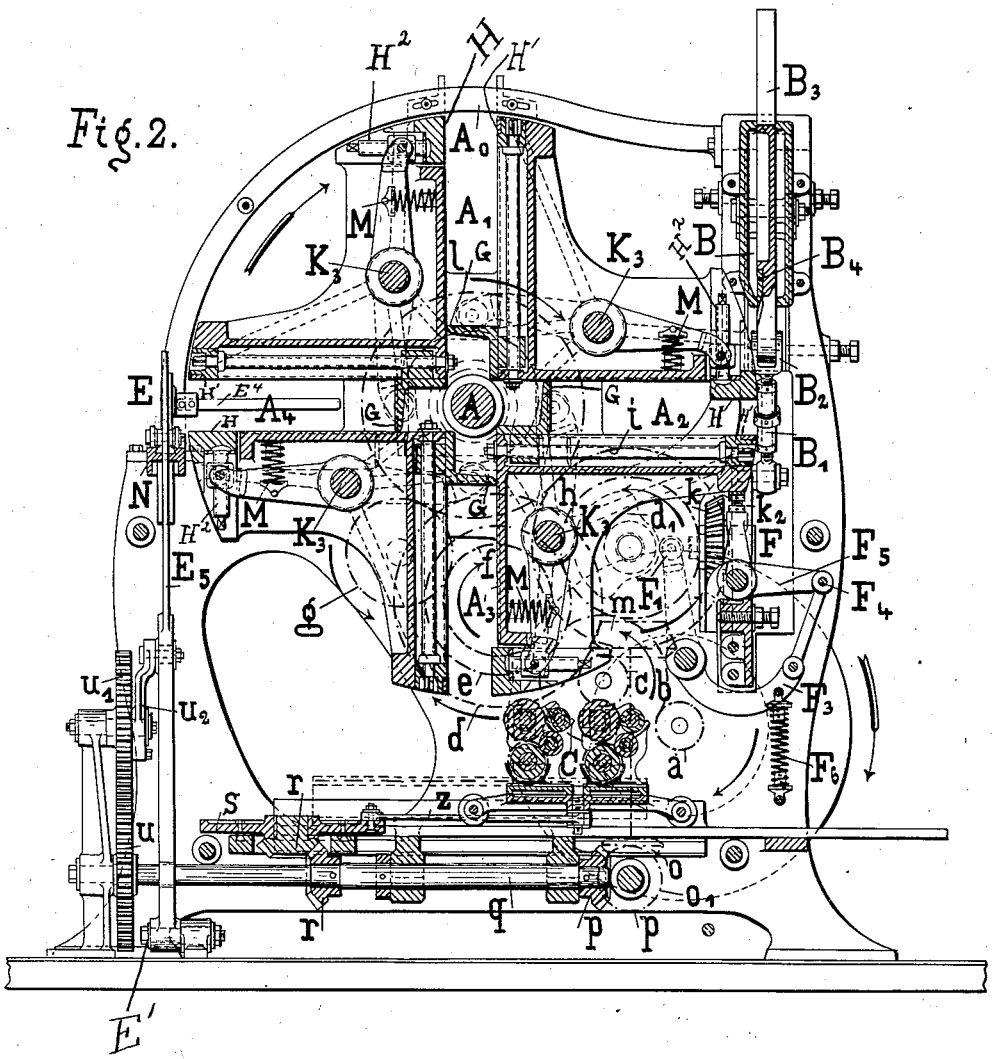
Figure 11:
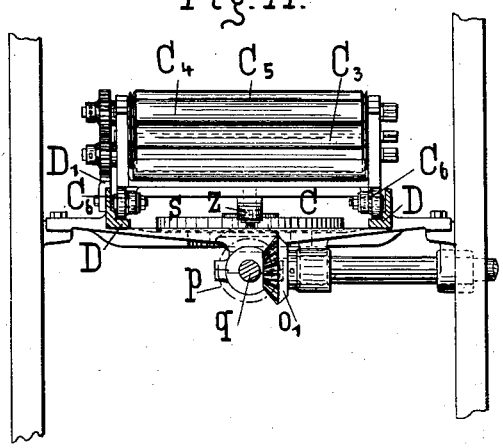

In the accompanying drawings, Figure 1 is a front view of the machine, partly in section. Fig. 2 is a vertical section of the same on the line A B, Fig. 1. Figs. 3 and 4 show the gearing of the machine separately. Fig. 5 is a front view of the rotary feeding device for the books. Fig. 6 is a side view thereof, showing the shafts, &c., in section. Fig. 7 is a front view of the cutting mechanism. Fig. 8 is a side view thereof. Fig. 9 is a front view, and Fig. 10 a side view, of a cutting-support. Fig. 11 is a front view, and Fig. 12 a transverse section, of the mechanism for coloring the cut edges of the books. Fig. 13 is a rear view, and Fig. 14 a side view, of the delivering mechanism. Fig. 15 is a diagrammatic elevation of the gearing indicated in Fig. 2, showing particularly the relative positions of the mutilated gears, hereinafter described, and of the teeth occupying one-half of the peripheries thereof.

In machines as used at present for cutting the edges of books the books are pushed in under the knife and are taken out again, which is tedious and dangerous to the operator. In the machine described hereinafter the books are fed quickly and without danger into the receiver of a rotary feeding device at the side of the knife.

The rotary feeding device consists of a middle part and four receptacles or receivers $A'$, $A^2$, $A^3$, and $A^4$, Fig. 2. It is rotated in the direction of the arrow and makes a quarter-revolution at each movement and then comes to rest. When the feeding device is at rest, the cutting, coloring, and delivery mechanisms come into operation. The book received by the rotary feeding device is carried step by step completely around the machine. During the first quarter-revolution it is carried from $A'$ to $A^2$. At $A^2$ is situated the cutting device B, which cuts the book while the feeding device is at rest. During the second quarter-revolution the rotary feeding device carries the book from $A^2$ to $A^3$, where the edges are colored or printed by the coloring device C, which does not form a part of the present invention. Thence the book is carried to $A^4$, where the discharging device E effects automatically the delivery of the book. (See Fig. 2.) While the first book is carried through the machine in the manner described another book is inserted at $A^0$ at each quarter-revolution in the next receptacle or receiver of the rotary feeding device. The latter, therefore, contains three books after a complete revolution, which are operated upon by the cutting, coloring, and delivering devices while the feeding device is at rest, and a fourth book is inserted at $A^0$. Therefore the rotary feeding device and the coloring and delivering devices move and come to rest alternately. This alternating motion is effected by the gearing shown in Figs. 1 and 2 and also in Figs. 3 and 4. The machine is first driven by a pulley $v$, which is disengaged and engaged through a friction-coupling by means of a lever $w$, a draw-bar $w'$, and a treadle $w^2$. (See Fig. 1.) A fly-wheel $x$ is situated at the side of the pulley $v$. Pinion $a$ engages with spur-wheel $b$. A counter-shaft $c$, engaging with a spur-wheel $d$, is situated on the same axle as spur-wheel $b$. Spur-wheels $e$ and $f$ are situated on the same axle as the spur-wheel $d$, the wheel $e$ engaging with a spur-wheel $h$ and the wheel $f$ with the spur-wheel $g$. The wheels $e$ and $f$ are provided with teeth on only one-half of their peripheries. Therefore they rotate on the spur-wheels $h$ and $g$ only during one-half of their revolutions. The rotation being then discontinued, the wheels $h$ and $g$ come to rest and also the mechanism operated by the latter. The wheel $e$ operates the cutting, coloring, and delivering devices. The wheel $f$ operates the rotary feeding device. The arrangement is so that the half of the wheel $e$ which has teeth commences to engage with the wheel $h$ at the moment in which the wheel $f$ commences to run empty with its smooth segments. Therefore the wheels $e$ and $f$ engage with their respective spur-wheels alternately, and the motion and rest of the mechanism by them alternate in a corresponding manner. The rotary feeding device is operated by means of the carrying-wheel $g$, which drives a large spur-wheel $l$, situated on the axle of the rotary feeding device and which is twice as large as the spur-wheel $f$. Consequently the spur-wheel $l$ makes only half a revolution, while the spur-wheel $f$ makes a whole revolution. Further, as the wheel $f$ is provided with teeth on only one-half of its circumference it must make four revolutions in order to rotate the axle of the wheel $l$ once—i. e., while the wheel $f$ makes one revolution the wheel $l$ and the feeding device, rotating with it, make only a quarter-revolution and are at rest while the smooth segment of the wheel $f$ runs empty. In the same manner the other wheel $e$, provided with teeth on only one half of its circumference, effects the alternating operation of the other mechanisms. The wheel $e$ operates the spur-wheel $h$ at the same moment in which the rotary feeding device comes to rest. The wheel $h$ is situated on the same axle as a bevel-wheel $i$, which operates a bevel-wheel $k$. The latter carries a crank-disk $k^2$, which effects the ascent and descent of a knife $B^4$. (See Fig. 2.) The bevel-wheel $k$ is only half as large as bevel-wheel $i$, which makes only half a revolution in a corresponding period to that of the wheel $k$, so that the crank-disk $k^2$ makes a whole revolution, drawing the knife $B^4$ down and pushing it up again, during half a revolution of the wheel $i$. The bevel-wheel $i$ operates also the coloring device. The former engages with a bevel-whel $m$, which is only half the size of the bevel-wheel $i$ and is situated on a vertical axle $n$, the lower end of which carries a bevel-wheel $c$, which engages with a bevel-wheel $o'$, Figs. 2, 11, and 12, which transmits the motion to an axle $q$ by bevel-wheels $p$ $p$. The axle $q$ carries bevel-wheels $r$ $r$, which operate a crank-disk $s$. To the latter is attached a connecting-rod $z$, which is forced to follow the rotation and changes the rotary motion into a reciprocating motion, which effects the reciprocation of the carriage C, Figs. 2, 11, and 12, with the coloring device and the coloring of the downward edges of the book, which is held at $A^3$ in the rotary feeding device. The axle $q$ operates also the delivering device E. The former carries a spur-wheel $u$, Figs. 13 and 14, which engages with a spur-wheel $u'$, and thus rotates a crank $u^2$, which gives an oscillating movement to a lever $E^5$, and thus effects the delivery of the book in the manner described hereinafter.

The foregoing gives a general view of the invention. The following describes the details shown in Figs. 5 to 14.

Fig. 5 is a plan view of the rotary feeding device for the books. Fig. 6 is a side view thereof. The rotary feeding device consists of a body rotating with the axle A and carrying four receivers $A'$ $A^2$ $A^3$ $A^4$, projecting outward, with holding devices. Each receiver is box-shaped and provided with a pressing-beam which presses or jams a book in the said receiver. To insure the correct insertion of the books, each receiver is provided with a projecting angle-piece G, Fig. 6, against which the back of the book is placed. The position of the projecting angle-piece G is regulated, as in paper-cutting machines in common use, by a screw $G'$, which engages with a screw-thread of the projecting angle-piece G and moves the latter toward or from the press-beam, according to the rotation of the screw. A pressing-beam H, before mentioned, is provided on each receiver and clamps the book in the receiver. The pressing-beam H is adapted to move between the sides $A^5$ of the receiver on tongued guides and can therefore be moved toward or away from the opposite part $H'$, Fig. 6. When a book is to be inserted into the receiver, the pressing-beam H must recede from the part $H'$ to allow the book to pass. When the book is to be fixed, the beam H is caused to approach the part $H'$. This is effected by four levers K, situated at each side of the feeding devices and operated by means of rollers $K^4$, running on an eccentric or cam L, situated at each side of the frame of the machine. The respective levers K rotate an axle $K^3$, on the middle of which is situated a lever $K'$, connected by a swivel-pin $K^2$ to the pressing-beam H. The lever $K'$ moves in accordance with the rise or fall of the lever K on the fixed eccentric L and moves the pressing-beam H toward or away from the part $H'$, thus automatically securing or releasing the book. As the thickness of the books varies and the pressing-beam H travels always the same distance, the difference between distance between the parts H $H'$ of the clamp is regulated to correspond with the varying thickness of the books by the adjusting device $H^2$, consisting of a rotatable screw bearing on the jaw H and working in a nut carried by the pressure-arm $K'$, by means of which the pressing-beam H can be adjusted relatively to the part $H'$, according to the thickness of the book to be inserted. The automatic return of the levers K and of the pressing-beam H to allow of the insertion of a book is effected by the spring M.

The cutting mechanism is illustrated in Figs. 7 and 8, Fig. 7 being a front elevation and Fig. 8 a side view, partly in section. The cutting mechanism is operated by the spur-wheel $h$, (see Fig. 1,) carrying the bevel-wheel $i$, which drives the bevel-wheel $k$, on which is situated a crank-disk $k^2$, Figs. 7 and 8. The crank-disk $k^2$ is connected by pins $k^3$ with a draw-bar $B'$, which is attached at $B^2$ to a beam $B^3$, which carries a knife $B^4$. The knife-beam $B^3$ slides up and down in the frame and is guided by roller-pins in oblique slots or ways $B^5$, Figs. 1 and 7. The rotation of the crank-disk $k^2$ is changed by the connecting-rod $B^4$ into a reciprocating motion, which causes the alternating ascent and descent of the knife-beam $B^3$ and the knife $B^4$.

In consequence of the oblique slots B⁵, Fig. 1, the movement of the knife B⁴ is diagonal to insure a better cut. The knife B⁴ is arranged obliquely to the cutting-table and cuts against a lower knife situated on the fixed clamp-jaw H' opposite to the pressing-beam H of the rotary feeding device.

Fig. 9 is a front view, and Fig. 10 is a side view, of a cutting-support F. The cutting-support (shown also in Figs. 1 and 2) is designed to give the necessary support to that receiver of the rotary feeding device which is below the cutting device against the pressure of the knife acting from above. In order to allow the rotary feeding device to continue its travel after the cutting operation, it is necessary that the cutting-support F retires to clear the path at the moment when the rotary feeding device is to continue its journey. This is effected by the mechanism shown in Figs. 9 and 10. A cam $d'$ is situated on the axle which carries the bevel-wheel $i$. A lever F⁷, with a roller F', moves on the face of the cam $d'$, against which it is pressed by a spring F⁶. The lever F⁷ rotates with the axle F². The same axle carries a lever F³, which reciprocates, by means of a connecting-rod and lever F⁴, the support F, situated on the axle F⁵, the movement being indicated in dotted lines in Fig. 10. When the support F is to support the rotary feeding device, it passes to the left, Figs. 2 and 10, where it remains at rest until the edge of the book has been cut. When this has been done, the eccentric presses the lever F' and the support F back into the position shown in dotted lines in Fig. 10, and the rotary feeding device has room to pass. The position of rest and the movement of the cutting-support F with the lever mechanism are obtained by the curves of the cam $d'$. A brake R, Fig. 1, is provided, so that the rotary feeding device comes to rest on the support F without jar. The brake R is operated by a projection at the side of the rotary feeding device, which pushes the spring-pressed pin R' to the left at each quarter-rotation. The pin R is connected to a brake-lever R², the pressure of which against the wheel R³ brakes the mechanism.

Figure 12:
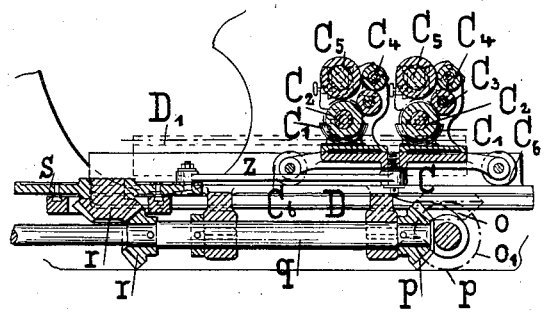
Figure 13:
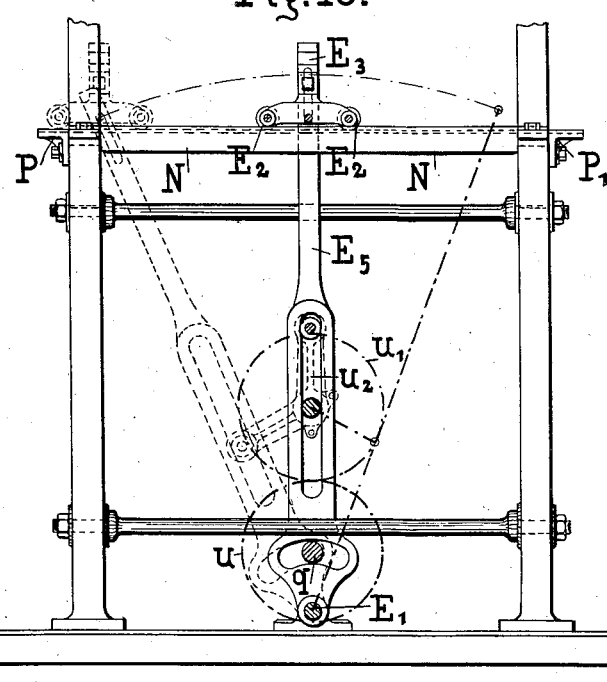

Fig. 11 is a front view, and Fig. 12 is a transverse section, of a mechanism for coloring the edges of a book after they have been cut, said coloring mechanism not being claimed in this application, but is shown so that a better understanding may be had of the complete machine. This coloring mechanism consists, essentially, of a carriage C, provided with two printing or coloring devices, which print the edges in one or more colors in the manner of known color-printing machines. These printing devices consist of the color-receptacles C', containing liquid color, which is taken up by india-rubber rollers C² C³ C⁴ and fed to a printing-roller C⁵. The latter is also, preferably, made of india-rubber and is provided with raised patterns by which the color or colors is printed on the cut edge according to the desired pattern of ornamentation. In order to carry out the operation cleanly, the printing-rollers C⁵ engage through pinions with a rack D'. Instead of two coloring or printing devices one, three, or more of such devices may be provided, according to the number of colors to be printed. The printing or coloring of the book edges is effected by the passage of the carriage C, with the printing devices, under the book held in the downward receiver of the rotary feeding device, Fig. 2, the printing-roller C⁵ printing the color onto the edge of the book according to the raised pattern of the roller. The printing-carriage C runs by means of rollers C⁶, Figs. 11 and 12, on rails D and is suitably guided. It is reciprocated by a connecting-rod $z$, connected to the rotary crank-disk S, which is operated by bevel-wheels $r$ $r$, situated on the axle $q$ and operated by bevel-wheels $p$ $p$. The other driving mechanism has been hereinbefore described. The coloring devices for the cut edges of the book may be arranged in a different manner and in a different place. The carriage C may pass through the machine transversely instead of longitudinally.

Figure 14:
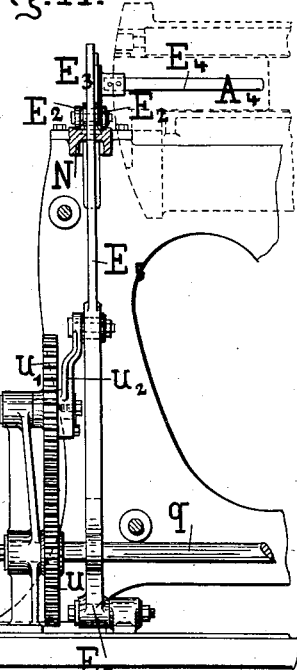
Figure 15:
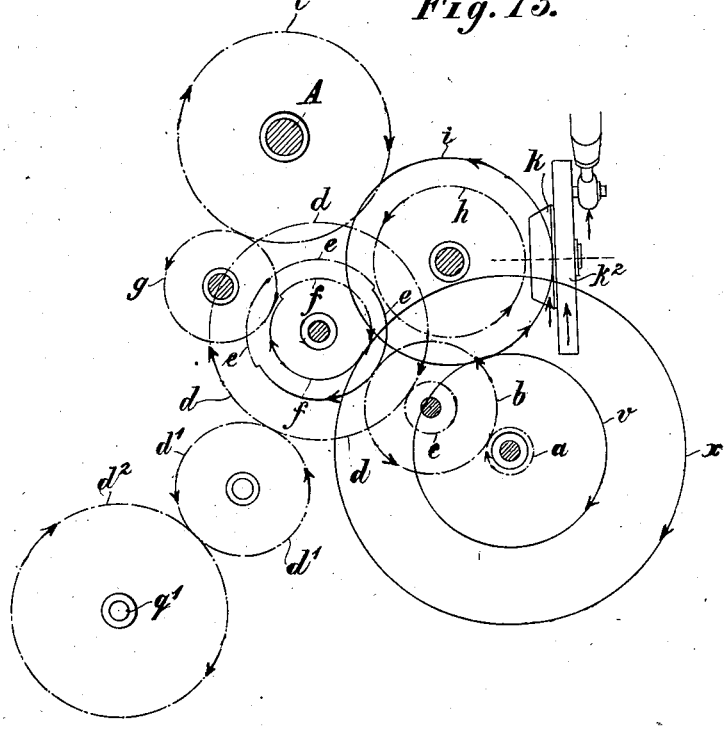

Fig. 13 is a rear elevation, and Fig. 14 is a side view, partly in section, of the delivering mechanism. The delivering mechanism, which removes the book from the machine, consists of the oscillating lever E⁵, pivoted at E' and operated by the crank $u^2$, situated on the spur-wheel $u'$, which latter is operated by the spur-wheel $u$. The lever E⁵ is connected at the top with the delivery-carriage E³, which runs, by means of rollers, on rails N and is reciprocated on the latter, by the lever E⁵ to an extent indicated by dotted lines in the drawings. An adjustable arm E⁴ is arranged on the delivery-carriage E³, Fig. 14, and passes during its reciprocating journey through the receiver of the rotary feeding device, pushing the book out of the receiver from the side P of the machine to the side P', Fig. 13.

What I claim, and desire to secure by Letters Patent of the United States, is—

1. In a machine for cutting the edges of books, the combination of the rotating receivers A', A², A³, A⁴, each comprising a support approximately radial to the axis of rotation and a clamp operating tangentially to clamp the edges of the book in said support; gearing imparting intermittent rotation to said receivers in one direction, a guided cutting device B, operating in conjunction with said receivers, automatic mechanism actuating the cutting device while the receivers are at rest, and a suitable discharging device for the books, substantially as described.

2. In a machine for cutting the edges of books, the combination of a feeding device having suitable book-receivers, gearing imparting intermittent rotation to the feeding device, a cutting device to which the book-receivers are successively presented by their intermittent rotation: a pressing device and mechanism for operating the same, tightly clamping the edges of the book to be cut, prior to the operation of the cutter, and a movable support sustaining the successive book-receivers under the action of the cutter, substantially as set forth.

3. In a machine for cutting the edges of books, the combination of rotatable receivers and clamping devices; gearing imparting intermittent rotation thereto, whereby the books are carried from the place of insertion to the place of cutting; a guided cutting device operating in conjunction with said rotatable receivers and clamps; and automatic mechanism actuating said cutting device while the receivers are at rest, substantially as described.

4. In a machine for cutting the edges of books the combination of a rotating feeding device having a number of book-receptacles, each comprising a radial support and a tangentially-moving pressing-beam to clamp the edges of the books on said support; mutilated gearing imparting periodic rotation to said feeding device through parts of a circle corresponding in number to the book-receptacles; a guided cutting device to which the books are successively presented by the intermittent rotation of the receivers and actuating mechanism for the cutting device operating alternately with the rotary motion of the feeding device, so that the cutter operates while the feeder is at rest, and vice versa, substantially as described.

5. In a machine for cutting the edges of books, the combination of three or more receivers for the reception successively of three or more books; mutilated gearing by which the receivers are moved periodically through parts of a circle, corresponding to the number of receivers; a pressing device consisting of a rocking lever and mechanism imparting intermittent oscillatory motion thereto and a movable pressing-beam H having an adjusting device $H^2$ for holding the books, substantially as described.

6. In a machine for cutting the edges of books, the combination of three or more receivers for the reception successively of three or more books, mutilated gearing by which the receivers are moved periodically through parts of a circle, corresponding to the number of receivers, a pressing device consisting of a rocking lever and mechanism imparting intermittent oscillatory motion thereto and a movable pressing-beam H having an adjusting device $H^2$ for holding the books and the movable support actuated by cam $d'$ and sustaining the successive receivers under the action of the cutter, substantially as described.

7. In a machine for cutting the edges of books, the combination of three or more receivers for the reception successively of three or more books: mutilated gearing by which the receivers are moved periodically through parts of a circle, corresponding to the number of receivers, a pressing device consisting of a rocking lever and mechanism imparting intermittent oscillatory motion thereto, a pressing-beam H having an adjusting device $H^2$ for holding the books: a cutting device B; the movable support which sustains the successive receivers under the action of the cutter; and mechanism for moving said support out of the way to permit the rotation of the receivers, substantially as described.

In testimony whereof I have hereunto set my hand in the presence of two witnesses.

EDUARD GROSSE.

Witnesses:
RUDOLPH FRICKE,
B. H. WARNER, Jr.